(12) United States Patent
Achanta et al.

(10) Patent No.: US 10,956,578 B2
(45) Date of Patent: Mar. 23, 2021

(54) FRAMEWORK FOR DETERMINING RESILIENT MANIFOLDS

(71) Applicant: General Electric Company, Schenectady, NY (US)

(72) Inventors: Hema Achanta, Schenectady, NY (US); Lalit Keshav Mestha, North Colonie, NY (US); Weizhong Yan, Clifton Park, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 243 days.

(21) Appl. No.: 16/152,546

(22) Filed: Oct. 5, 2018

(65) Prior Publication Data
US 2020/0110881 A1    Apr. 9, 2020

(51) Int. Cl.
*G06F 21/57* (2013.01)
*G05B 19/048* (2006.01)

(52) U.S. Cl.
CPC ......... *G06F 21/577* (2013.01); *G05B 19/048* (2013.01); *G05B 2219/24015* (2013.01); *G06F 2221/034* (2013.01)

(58) Field of Classification Search
CPC ........ G05B 19/048; G05B 2219/24015; G06F 21/552; G06F 21/554; G06F 21/577; G06F 2221/034
See application file for complete search history.

(56) References Cited

U.S. PATENT DOCUMENTS 9,405,900 B2    8/2016  Dixit et al.
9,942,254 B1    4/2018  Averbuch et al.
(Continued)

OTHER PUBLICATIONS

Jalal, Ajil et al., "The Robust Manifold Defense: Adversarial Training using Generative Models", Computer Vision and Pattern Recognition, Dec. 26, 2017, arXiv:1712.09196v3 [cs.CV]. (pp. 1-17, 17 total pages).

(Continued)

*Primary Examiner* — Chad G Erdman
(74) *Attorney, Agent, or Firm* — Buckley, Maschoff & Talwalkar LLC (57) ABSTRACT

According to some embodiments, a system, method and non-transitory computer-readable medium are provided to protect a decision manifold of a control system for an industrial asset, comprising: a detection and neutralization module including: a decision manifold having a receiver configured to receive a training dataset comprising data, wherein the decision manifold is operative to generate a first decision manifold with the received training dataset; and a detection model; a memory for storing program instructions; and a detection and neutralization processor, coupled to the memory, and in communication with the detection and neutralization module and operative to execute program instructions to: receive the first decision manifold, wherein the first decision manifold separates a normal operating space from an abnormal operating space; determine whether there are one or more inadequacies with the detection model; generate a corrected decision manifold based on the determined one or more inadequacies with the detection model; receive a projected adversary strategy; generate a resilient decision manifold based on the corrected decision manifold and received projected adversary strategy; and an output configured to output a neutralized signal to operate the industrial asset via the control system. Numerous other aspects are provided.

20 Claims, 7 Drawing Sheets

(56) References Cited

U.S. PATENT DOCUMENTS

| | | | |
|---|---|---|---|
| 10,027,699 B2 | 7/2018 | Wei et al. | |
| 2015/0213706 A1* | 7/2015 | Bai | G05B 23/0221 340/635 |
| 2016/0330225 A1 | 11/2016 | Kroyzer et al. | |
| 2017/0061322 A1* | 3/2017 | Chari | H04L 63/1425 |
| 2018/0159879 A1 | 6/2018 | Mestha et al. | |
| 2019/0347410 A1* | 11/2019 | Kesarwani | G06F 21/577 |

OTHER PUBLICATIONS

Joshi, Shalmali et al., "xGEMs: Generating Examplars to Explain Black-Box Models", Jun. 22, 2018, arXiv:1806.08867v1 [cs.LG], (pp. 1-12, 12 total pages).

Metzen, Jan Hendrik et al., "On detecting adversarial perturbations", ICLR 2017, 2017, (pp. 1-12, 12 total pages).

"Recommended Practice: Improving Industrial Control System Cybersecurity with Defense-in-Depth Strategies", Industrial Control Systems Cyber Emergency Response Team, pp. 1-58, retrieved from https://www.hsdl.org/?view&did=797585, Sep. 2016.

Hendrik Metzen et al., "On detecting adversarial perturbations", arXiv:1702.04267 [stat.ML], pp. 1-12, Feb. 2017.

Mestha et al., "Cyberattack Detection and Accommodation Algorithm for Energy Delivery Systems", Proceedings of IEEE Conference on Control Technology and Applications, pp. 1326-1331, Aug. 27-30, 2017.

\* cited by examiner

FRAMEWORK FOR DETERMINING RESILIENT MANIFOLDS

BACKGROUND

Industrial control systems that operate physical systems (e.g., associated with power turbines, jet engines, locomotives, autonomous vehicles, etc.) are increasingly connected to the Internet. As a result, these control systems have been increasingly vulnerable to threats, such as cyber-attacks (e.g., associated with a computer virus, malicious software, etc.), that could disrupt electric power generation and distribution, damage engines, inflict vehicle malfunctions, etc. Such attacks can diminish the performance of a control system and may cause total shut down or catastrophic damage to a plant.

It would therefore be desirable to protect an industrial asset from cyber-attacks/faults in an automatic and accurate manner when attacks directly harm control systems.

SUMMARY

According to some embodiments, a system is provided to protect a decision manifold of a control system for an industrial asset, comprising: a detection and neutralization module including: a decision manifold having a receiver configured to receive a training dataset comprising data, wherein the decision manifold is operative to generate a first decision manifold with the received training dataset; and a detection model; a memory for storing program instructions; and a detection and neutralization processor, coupled to the memory, and in communication with the detection and neutralization module and operative to execute program instructions to: receive the first decision manifold, wherein the first decision manifold separates a normal operating space from an abnormal operating space; determine whether there are one or more inadequacies with the detection model; generate a corrected decision manifold based on the determined one or more inadequacies with the detection model; receive a projected adversary strategy; generate a resilient decision manifold based on the corrected decision manifold and received projected adversary strategy; and an output configured to output a neutralized signal to operate the industrial asset via the control system.

Some embodiments comprise a computer-implemented method to protect a decision manifold for a control system of an industrial asset, comprising: generating a first decision manifold with a received training dataset, wherein the first decision manifold separates a normal operating space from an abnormal operating space; determining whether there are one or more inadequacies with a detection model; generating a corrected decision manifold based on the determined one or more inadequacies with the detection model; receiving a projected adversary strategy; generating a resilient decision manifold based on the corrected decision manifold and received projected adversary strategy; and outputting a neutralized signal to operate the industrial asset via the control system.

Some embodiments comprise a non-transitory computer-readable medium storing instructions that, when executed by a computer processor, cause the computer processor to perform a method comprising: generating a first decision manifold with a received training dataset, wherein the first decision manifold separates a normal operating space from an abnormal operating space; determining whether there are one or more inadequacies with a detection model; generating a corrected decision manifold based on the determined one or more inadequacies with the detection model; receiving a projected adversary strategy; generating a resilient decision manifold based on the corrected decision manifold and received projected adversary strategy; and outputting a neutralized signal to operate the industrial asset via the control system.

Some technical advantages of some embodiments disclosed herein are improved systems and methods to protect an industrial asset from cyber-attacks/faults in an automatic and accurate manner. Some embodiments may neutralize threats on-the-fly and create a protective barrier around the system that may make it more difficult for the adversaries to breach.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

Industrial Control Systems ("ICS") include a logical network architecture that may contain multiple layers (e.g., Layers 0 to 5 per the Purdue ICS model), with layers 4 and 5 corresponding to Enterprise Scale Network, and layer 3 corresponding to a manufacturing zone/control center network. Layers 0-2 are closer than layers 3-5 to the physical system being operated by the ICS, and contain TCP/IP, Human Machine Interfaces (HMI), connections to field devices (physical systems). As such, the ICS that operates a physical system is increasingly connected to the Internet. Note that, as used herein, the term "industrial" may be associated with any system that is connected to an external source, such as the Internet in the case of a cyber-physical system or locally operating an air-gapped physical system. As a result, these control systems have been increasingly vulnerable to threats. Protecting an asset may depend on detecting such attacks as well as naturally occurring faults and failures.

The ICS may include a detection process to detect when the physical system is moving away from normal operation to abnormal operation, based on comparison of a data point to a decision manifold. As used herein, a "decision manifold" includes a decision boundary (e.g., linear boundary, non-linear boundary, multi-dimensional boundary, etc.) that separates normal behavior or operations from abnormal operations or behavior. The decision manifold may be created with machine learning by training the detection process with specific data sets, including ground truth values. As used herein, "ground truth" refers to properly validated (provable) data for a particular feature. During training, the detection process uses the specific data sets to learn how to differentiate normal operations from abnormal operations. In one or more embodiments, the system periodically updates the decision boundary to improve the performance of the decision boundary to reflect the latest changes to the devices in terms of aging and the operating conditions. These updates may increase the resiliency of the decision manifold itself, thereby protecting the control system. An attack on the decision manifold may be an indirect attack on the control system, as the decisions based on the decision manifold may affect decisions of the control system. The control systems may be vulnerable to these indirect attacks as in the recent past they have more frequently begun to use data-based methods (e.g., machine learning) to make better decisions.

Threats to the ICS may not only include attacks on the actual instructions issued by the ICS to the physical industrial asset, but also may include attacks to the detection process and decision manifold. Typically, a detection process may detect whether the physical system is operating in a normal or abnormal space, but may not detect whether the detection process and decision manifold can be trusted. Attacks to the detection process and decision manifold may include an attack on the data set the detection process uses to learn the distinction between normal and abnormal operations, and/or the data continuously flowing into the system.

Some embodiments provide for the detection of whether the detection process and decision manifold are operating in a normal or abnormal space. Some embodiments provide for protecting the decision manifold by protecting the data continuously flowing into the system in real-time, as well as protecting the training data set, by using learning and resiliency jointly to construct resilient decision manifolds, even in the presence of adversarial activity in the ICS network. The resilient decision manifold may be a nonlinear dynamic system that evolves with time, as more training data is received in the system. Some embodiments may provide a defense mechanism against adversarial attacks that aim at increasing the misclassification error of the decision manifold. In one or more embodiments the defense mechanism may include a proactive strategy that may provide steps to take based on knowledge of a possible attack and a reactive strategy that may provide steps to respond to an attack, as described further below with respect to FIG. 3. Some embodiments may also provide a responsive solution for when the data is attacked (e.g., correct the data that has been changed in the training data set by the attack, or in real-time, fix the corrupted data) to "neutralize" the impact that the adversary intended to create on the ICS network. As a non-exhaustive example, when an attack alters the training data set, the decision manifold produced by that altered training data set may label positive elements as negative and vice versa. One or more embodiments correct the labels such that a positive element is labeled as positive.

Figure 1:
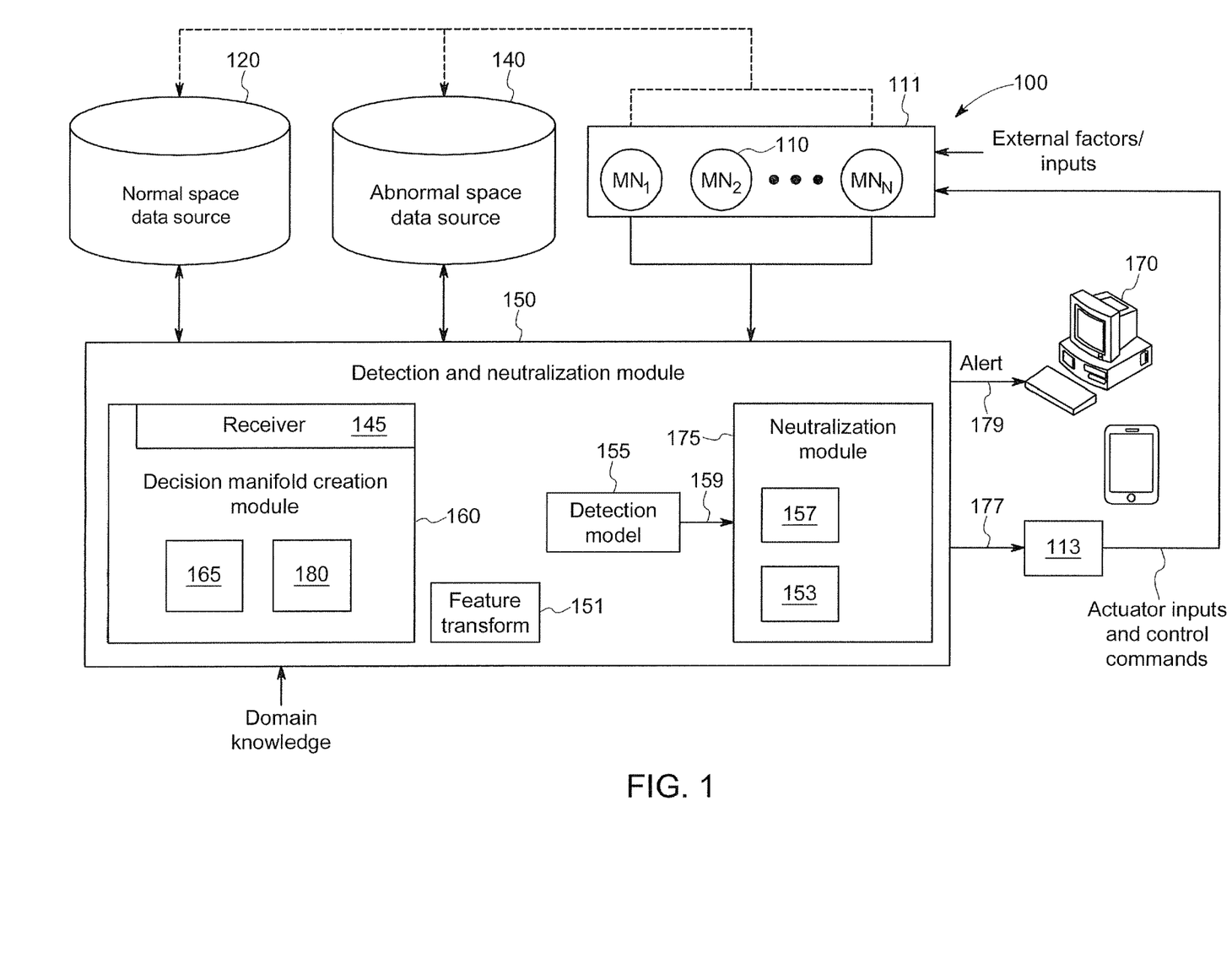
FIG. 1 is a high-level block diagram of a system that may be provided in accordance with some embodiments.

FIG. 1 is a high-level architecture of a system 100 in accordance with some embodiments. The system 100 may include a "normal space" data source 120 and an "abnormal space" data source 140. The normal space data source 120 might store, for each of a plurality of monitoring nodes 110, a series of normal values over time that represent normal operation of an industrial asset (e.g., generated by a model or collected from actual monitoring node 110 data as illustrated by the dashed line in FIG. 1). The abnormal space data source 140 might store, for each of the monitoring nodes 110, a series of abnormal values that represent abnormal operation of the industrial asset (e.g., when the system is experiencing a fault or cyber-attack). The data sources may receive data from aspects of the system in a continuous fashion in the form of continuous signals or streams of data or combinations thereof. In one or more embodiments, physics-based and other models may be used to generate normal and "abnormal" data ("training sets"). The monitoring nodes 110 may monitor an industrial asset 111 (e.g., power plant, wind turbine, etc.). In one or more embodiments, the industrial asset 111 may receive actuator inputs and control commands from the industrial control system 113, and may also receive data related to other external factors and inputs.

Information from the normal space data source 120 and the abnormal space data source 140 may be provided to a decision manifold creation module 160 of a detection and neutralization module 150, via a receiver 145 at the decision manifold creation module 160. The decision manifold creation module 160 may use this data, along with domain knowledge, to create a decision manifold 165 (that is, a boundary that separates normal behavior and abnormal behavior). The decision manifold 165 may then be used by the detection and neutralization module 150 executing a detection model 155 and a neutralization module 175. The detection model 155 may, for example, monitor streams of data from the monitoring nodes 110 comprising data from sensor nodes, actuator nodes, and/or any other critical monitoring nodes (e.g., monitoring nodes $MN_1$ through $MN_N$) associated with the industrial asset 111 and automatically output a classification result (e.g., indicating that operation of the industrial asset is normal or abnormal to one or more remote monitoring devices 170 when appropriate (e.g., for display to a user) and to the neutralization module 175, as described herein.

Figure 5:
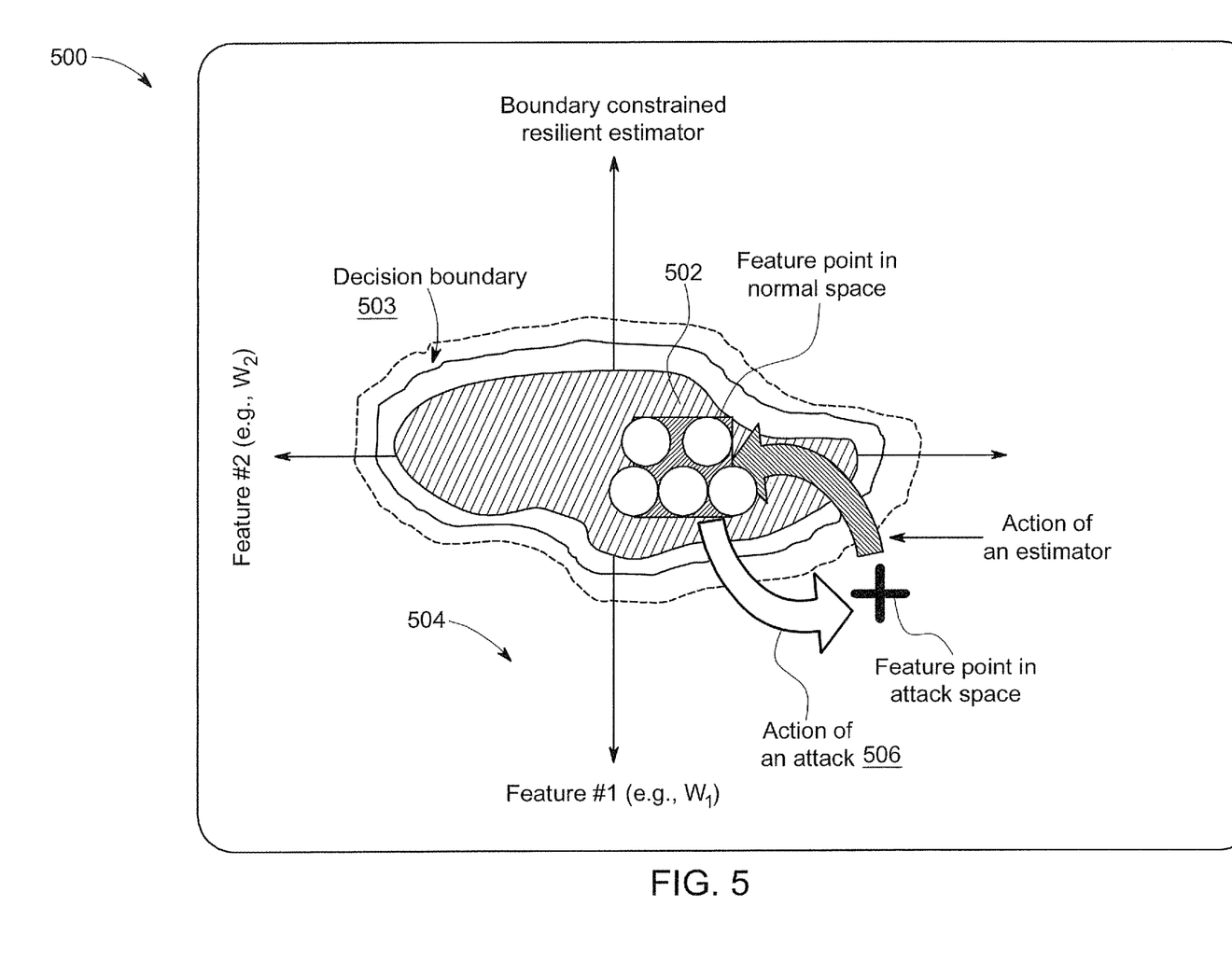
FIG. 5 is a diagram illustrating a boundary and correction process in accordance with some embodiments.

FIG. 5 The neutralization module 175 may block the threats by automatically neutralizing their effects on the control system even while the attacks are in progress. Neutralization of the affects may be achieved at key signals by estimating true operational states of the system with a Boundary and Performance-constrained Resilient Estimator ("BPRE") 157. Furthermore, true signals for operational normalcy may be computed from estimated states enabling the system to continue to function properly.

The neutralization methods described herein may be implemented as software such as an application or a service and may be incorporated within an industrial system such as a control system, a computer, a server, a cloud platform, a machine, an equipment, an aircraft, a locomotive, and the like. While progress with machine and equipment automation has been made over the last several decades, and assets have become "smarter," the intelligence of any individual asset pales in comparison to intelligence that can be gained when multiple smart devices are connected together, for example, in the cloud. As described herein, an asset is used to refer to equipment and/or a machine used in fields such as energy, healthcare, transportation, heavy manufacturing, chemical production, printing and publishing, electronics, textiles, and the like. Aggregating data collected from or about multiple assets can enable users to improve business processes, for example by improving effectiveness of asset maintenance or improving operational performance if appropriate industrial-specific data collection and modeling technology is developed and applied.

Assets described herein can include or can be a portion of an Industrial Internet of Things ("IIoT"). In an example, an IIoT connects assets including machines and equipment, such as turbines, jet engines, healthcare machines, locomotives, oil rigs, and the like, to the Internet and/or a cloud, or to each other in some meaningful way such as through one or more networks. The examples described herein can include using a "cloud" or remote or distributed computing resource or service. The cloud can be used to receive, relay, transmit, store, analyze, or otherwise process information for or about one or more assets. In an example, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function.

The neutralization module 175 may include computational elements that act as a filter to remove attack signatures in a signal and may automatically output a correction or manipulation in the form of a neutralized signal 177 for execution by the ICS to maintain the operation of the industrial asset or return the operation of the industrial asset to the normal operating state.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The decision manifold creation module 160 may store information into and/or retrieve information from various data stores, such as the normal space data source 120 and/or the abnormal space data source 140. The various data sources may be locally stored or reside remote from the decision manifold creation module 160 (which might be associated with, for example, offline or online learning). Although a single decision manifold creation module 160 is shown in FIG. 1, any number of such devices may be included. Moreover, various devices described herein might be combined according to embodiments of the present invention. For example, in some embodiments, the decision manifold creation module 160 and one or more data sources 120, 140 might comprise a single apparatus. The detection and neutralization module 150 functions may be performed by a constellation of networked apparatuses, in a distributed processing or cloud-based architecture.

A user may access the system 100 via one of the monitoring devices 170 (e.g., a Personal Computer ("PC"), tablet, or smartphone) to view information about and/or manage current information in accordance with any of the embodiments described herein. In some cases, an interactive graphical display interface may let a user define and/or adjust certain parameters (e.g., attack detection trigger levels) and/or provide or receive automatically generated recommendations or results from the decision manifold creation module 160 and/or the detection and neutralization module 150.

In addition to the detection model 155 and neutralization module 175, the detection and neutralization module 150 includes additional computational blocks including a feature transform 151, an inverse feature transform 153, and a boundary and performance constrained resilient estimator ("BPRE") 157, which are further described herein.

As used herein, the term "feature" may refer to, for example, mathematical characterizations of data. Examples of features as applied to data might include the maximum, minimum, mean, standard deviation, variance, range, current value, settling time, Fast Fourier Transform ("FFT") spectral components, linear and non-linear principal components, independent components, sparse coding features, deep learning features, etc. As used herein, the term "automatically" may refer to, for example, actions that can be performed with little or no human intervention. According to some embodiments, information about detected abnormality may be transmitted back to an industrial control system.

Feature Transform: For a given scenario, time series signals (e.g., ~45 seconds) may be captured and pre-processed. These signals may be processed by the feature transform 151 into feature extraction algorithms (e.g., principal component analysis) to reduce the dimensionality or order of the system. For example, time series data from sensor nodes may be converted into feature vectors. The procedure is same for all other signals. When principal components are used as features as in the current implementation, weights become the features in reduced dimensions within the feature space. In the pre-processing step performed by the feature transform 151, temporal normalization of node data may be performed. As an example, when principal components are used as features, the normalized output may be expressed as a weighted linear combination of basis functions. In this feature extraction algorithm, weights are considered as features for y.

$$y = y_0 + \sum_{j=1}^{M} w_j \psi_j$$

$$w_j = \psi_j^T (y - y_0)$$

In this example, $y_0$=average sensor output, $w_j$=jth weight (i.e., PCA feature), and $\psi_j$=jth basis vector. Because of the orthonormal nature of the basis vectors, each feature may be computed using the equation shown above. The basis vectors can be obtained using ensemble data set from the system collected over time (i.e., historical data) or with perturbations on a virtual model (e.g., digital twin) of the asset.

Figure 2:
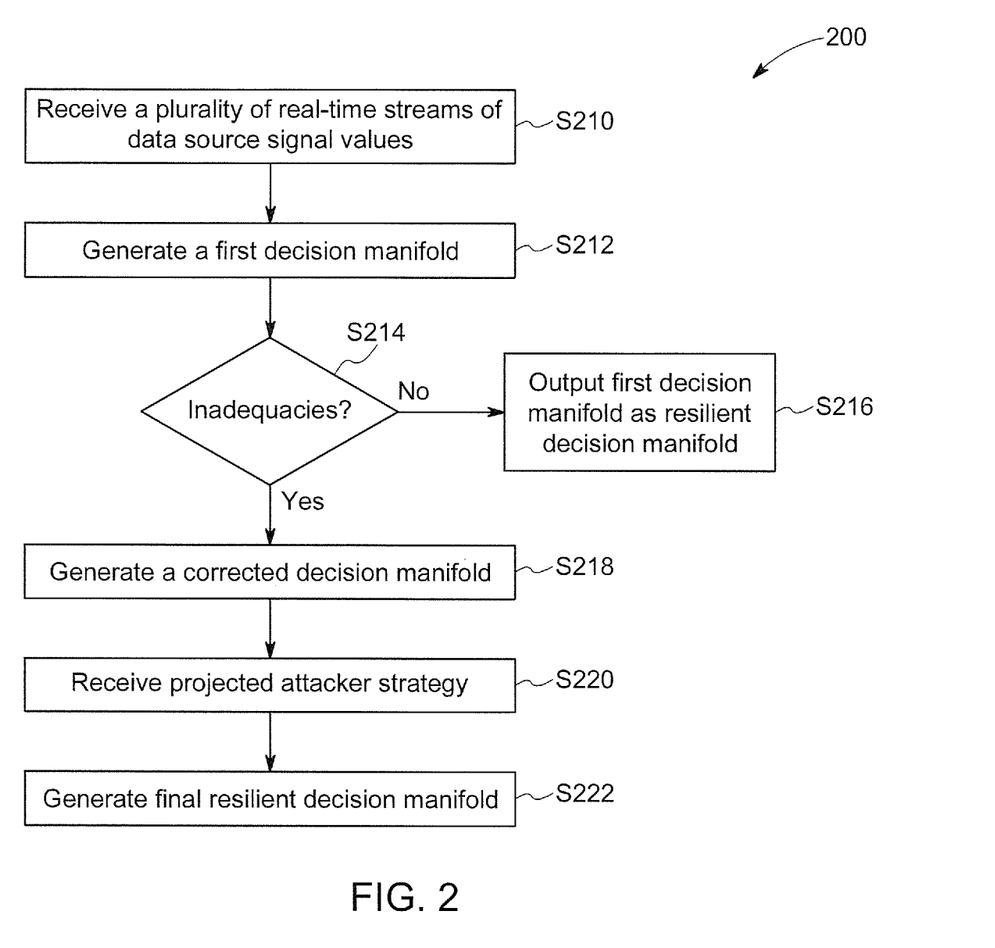
FIG. 2 is an industrial asset protection method according to some embodiments.

For example, FIG. 2 illustrates a process that might be performed by some or all of the elements of the system 100 described with respect to FIG. 1. Process 200, 400, and any other process described herein (e.g., 400 in FIG. 4), may be performed using any suitable combination of hardware (e.g., circuit(s)), software or manual means. For example, a computer-readable storage medium may store thereon instructions that when executed by a machine result in performance according to any of the embodiments described herein. In one or more embodiments, the system 100 is conditioned to perform the process 200 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto. The flow charts described herein do not imply a fixed order to the steps, and embodiments of the present invention may be practiced in any order that is practicable.

Figure 3:
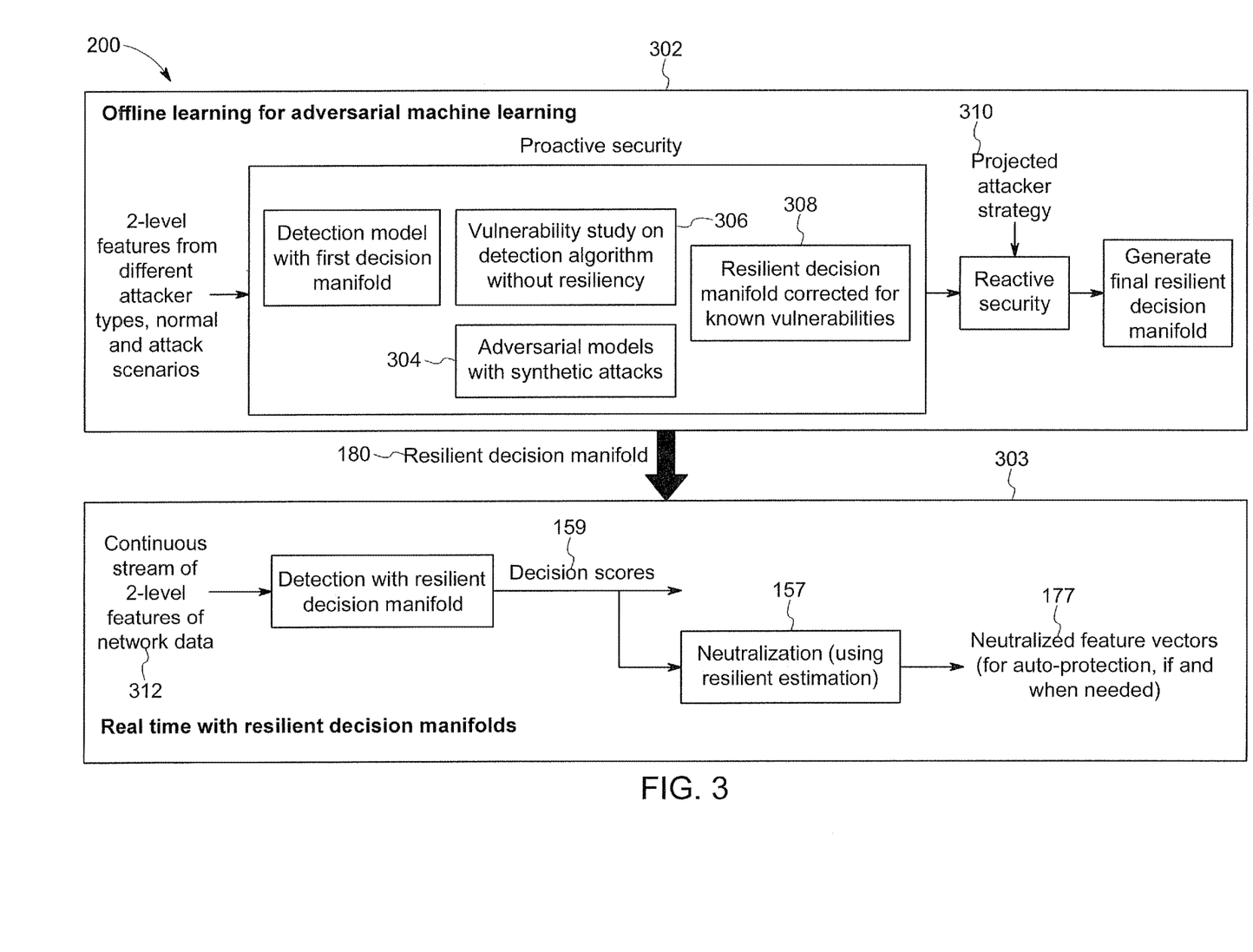
FIG. 3 is a block diagram of an offline learning phase and a real time learning phase in accordance with some embodiments.

The process 200 may be to build a resilient decision manifold 180. As shown in FIG. 3, the process 200 may include two phases: an offline learning phase 302 and a real-time decision making and update phase 303.

Initially, in an offline learning phase 302, at S210, the decision manifold creation module 160 may receive from a normal space data source 120 and abnormal space data source (e.g., per a plurality of monitoring nodes), a series of current values over time that represent a current operation of the industrial asset 111 as well as data values representing abnormal operations of the industrial asset 111. The system may also generate one or more abnormal scenarios to synthesize abnormal values. The abnormal values may be synthetically generated by creating a variety of synthetic attacks based on known attacks. In one or more embodiments, the current or normal operating values may also be synthetically generated based on known normal operating conditions. The system may convert the received series of current values and generated abnormal values into a set of current feature vectors and abnormal feature vectors, respectively. The values may be converted to feature vectors ("features") by a feature transform (e.g., Principal Component Analysis, etc.), as described above. It is noted that the conversion to features may reduce the amount of data being analyzed by the system, and filter out noise in the data. In one or more embodiments, the transformation process may be a two-step process, whereby the transform is applied to the initially received values to generate a first set of features, and then again to the first set of features to generate a second set of features. The use of the 2-level features may remove noise in the data resulting in capturing the most important and informative aspects of the data. The decision manifolds constructed from the 2-level features may be built in this new lower dimensional space (the 2-level transformation results in features in a lower dimensional space). It is noted that other levels (besides 2-levels) of features may be used. A multi-step approach may be used to obtain more abstract features provided the features may accurately and uniquely reconstruct the original signal they represent. The "training data set" may refer to the set of current and abnormal values. In one or more embodiments, the values in the training data set may be the "ground truth" values. As a non-exhaustive example, the training data set may include 90% normal values and 10% abnormal values. The decision manifold creation module 160 may generate a first decision manifold 165 based on the training data set at S212. The first decision manifold 165 may separate a normal operating space 502 from an abnormal operating space 504. The first decision manifold 165 may be a single expert/learner or an ensemble of learners/experts. Examples of decision manifold include, but are not limited to, Linear or Nonlinear Support Vector Machines, decision trees, random forests, etc.

In one or more embodiments, the process to train the detection model 155 may include an optimization process that learns how to separate positive elements from negative elements (e.g., a straight line in a 2-D space to separate the positive elements from the negative elements, and this line is the decision manifold). When the system is attacked, for example, and a label for a data point used to generate the decision boundary is switched from a normal value to an abnormal value, the slope of the decision boundary line may change. As a non-exhaustive example, the decision boundary line may be perpendicular to the x-axis, but after the attack, the line may be forty-five degrees from the x-axis. As such, the detection model 155 may identify the wrong data points as normal or abnormal. It is noted that the attacker may not change the detection model, but instead the data used to generate the decision manifold. As a non-exhaustive example, the attacker may change the ground truth values, during inception of the first decision manifold, or may attack the data used to update the training data, as will be described further below, with respect to update/real-time phase 404.

Next, in S214 it is determined whether there are any inadequacies with machine learning processes (e.g., detection models) used to build the decision. In one or more embodiments, this determination may be based on adversarial models 304 and a vulnerability study 306. One or more adversarial models may be generated including synthetic attacks. The synthetic adversarial models 304 may be built for known adversaries to identify adversarial targeting. The adversarial models 304 may try to imitate an attacker, to generate data that may be used to improve the training data set, which may, in turn, be used generate a resilient decision manifold 180, as described further below. The adversarial models 304 may be models that deliberately induce data into the training databases to increase the misclassification error. The adversarial models use information from the vulnerability study, and may generate data based on the vulnerabilities so that the misclassification error increases. The vulnerability study 306 may be executed to analyze the detection model 155 and determine whether there are one or more points where the detection model 155 is vulnerable to attack.

When in S214, it is determined there are no inadequacies, the process 200 proceeds to S216 and outputs the first decision manifold 165 as the resilient decision manifold 180.

When in S214, it is determined there are inadequacies, the process 200 proceeds to S218, and a corrected decision manifold 308 is generated that that includes corrections to the decision manifold, if it deviated from a correct decision manifold, and corrections to the training database in an instance it was detected that the training database was subject to an attack/adversarial data. These corrections may account for the known inadequacies, and may provide a resilient decision manifold. In one or more embodiments, the process 200 uses a fixed topology on the network.

The idea of making decision manifolds resilient to known vulnerabilities may be referred to as "proactive security".

The following steps S220 and S222 may be referred to a "reactive security" based correction. These steps use data collected about failed cases where the adversary has been able to break into the network. These data points may model the behavior and strategic pattern of the adversary (e.g., a pattern may be observed from the labels on the data that the attacker is trying to change.) In one or more embodiments, an "island" of data in the operating space where the system is continually operating abnormally may be identified, and then the pattern associated with this data may be used to project the attacker's strategy. As a non-exhaustive example, the attacker has repeatedly tried to bend the decision manifold from 90 degrees in the vertical axis to zero degrees in the horizontal axis, this pattern of how the labels on the data are being changed may be observed. This pattern may be used to build a game between the adversary and the defender of the network for further analysis or be may used to directly build a defense strategy.

In S220, a projected attacker strategy 310 is received. In one or more embodiments, the projected attacker strategy 310 may be generated as follows: the corrected decision manifold 308 and detecting model 155 may be deployed in a "honey pot". As conventionally known, a "honeypot," is a computer security mechanism set to detect, deflect, or in some manner, counteract attempts at unauthorized use of information systems. The honeypot may be designed to lure the attacker into thinking that it is the real system, so that the attacker's actions may be recorded. In one or more embodiments, the honeypot may be used to observe how the attacker may be trying to modify the detection model and corrected decision manifold. The observation made per the use of the honeypot may be both a proactive and passive strategy to observe the attacker.

Once the projected attacker strategy 310 is received, the decision manifold creation module 160 may change the corrected decision manifold 308 by adding or subtracting the identified "islands" from the corrected decision manifold 308 to generate a final resilient decision manifold 180 in S222.

In one or more embodiments, the decision manifold updates (e.g., corrected decision manifold and final resilient decision manifold) may be viewed in response to the adversary as the evolution of a dynamic system. This is done, in one or more embodiments, by viewing the parameters of the decision manifolds as a function of time. For example, consider a linear Support Vector Machine (SVM). The evolution of this linear SVM may be represented as:

$$f_t(x) = w_t x + b_t$$

where $w_t$ is the weight vector that is updated periodically and $b_t$ is the bias vector that is updated periodically. Such a dynamic evolution study of a passive adversary may be invoked in a honeypot once exploratory attacks have been detected or otherwise identified.

As described above, the reactive security strategy may look at patterns of misclassification errors produced by the decision manifold. An adversary may exploit the misclassified points of the decision manifold to trick the decision manifold. The reactive security strategy may record (over a period of time) the feature vectors and the corresponding data points that are misclassified by the decision manifold. These misclassified feature vectors may then be used to build islands in the normal and attack spaces defined by the decision manifolds. Removing these islands from the decision manifold may constitute the updated decision manifold thereby reducing the misclassification errors of the decision manifold.

In one or more embodiments, in the generation of the final resilient decision manifold, the process may use ensemble learning. Ensemble learning is about having multiple decision boundaries and using the decision outcome from one or more of these decision manifolds. This may increase the effort that it takes for an attacker to understand the decision-making process. However, unlike traditional ensemble learning that chooses the learners in prescribed order, in one or more embodiments, the set of learners/experts that will be used in real-time for the making the decisions may be randomized. This randomization may increase the attacker's cost of deciphering the decision manifold.

Turning now to a process 400 (FIG. 4) for update/real-time phase 303 according to some embodiments. In this process 400, the detection model 155 and resilient decision manifold 180 are deployed in S410. The detection and neutralization module 150 receives network data 312 in S412. The network data 312 may be received from a cloud to which the system 100 is connected, or from any other suitable source. The network data 312 may be, for example, internet packets coming in and leaving the network (e.g., one machine communicates with another through a wireless channel), or any other suitable input signals from monitoring nodes of the industrial asset 111, where each input signal comprises data representing current operation of the industrial asset 111. It is noted that, in some embodiments, before the detection and neutralization module 150 receives the network data 312, the 2-level features of the network data are computed.

Figure 4:
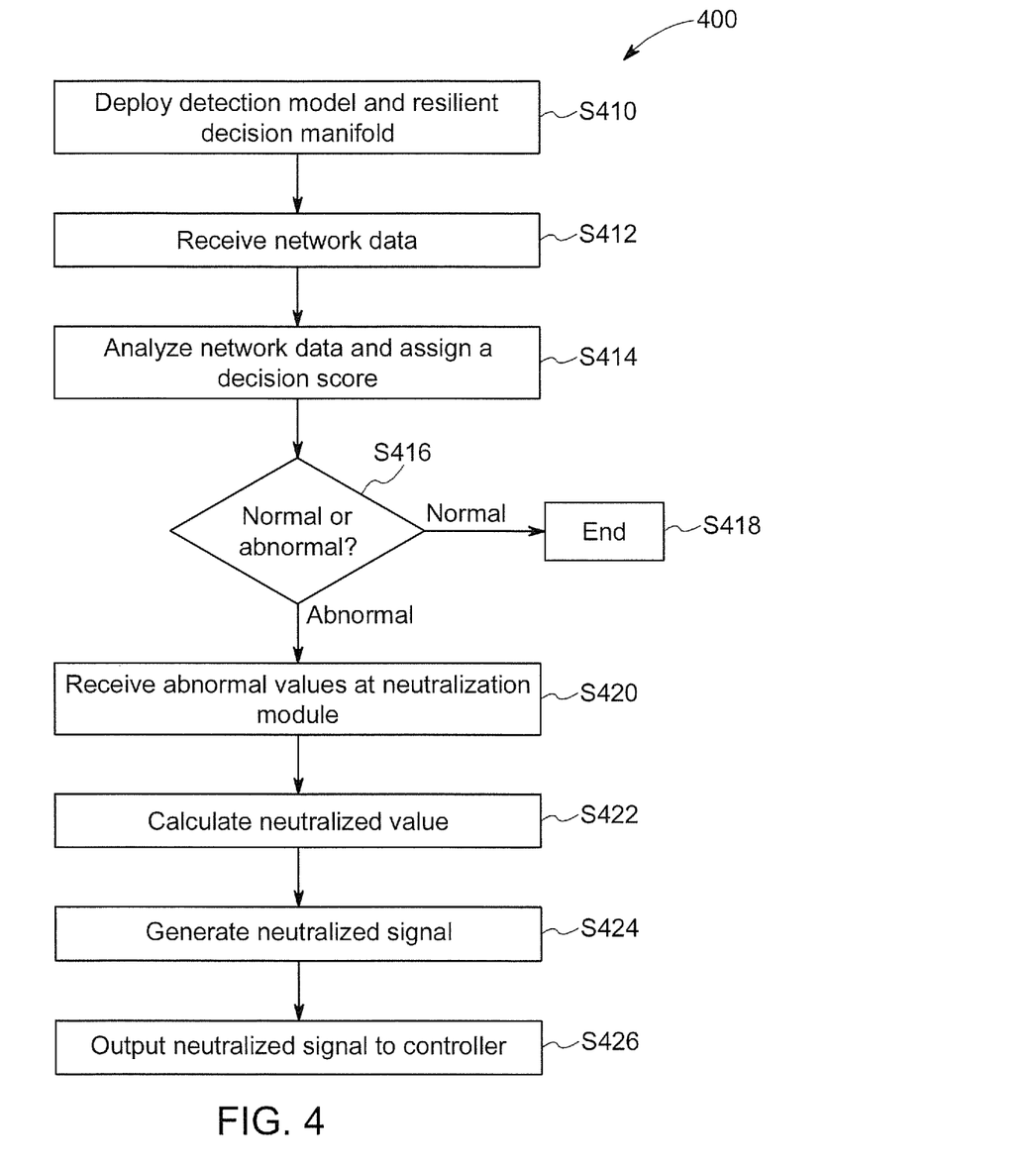
FIG. 4 is a flow diagram according to some embodiments.

Then, in S414 the detection and neutralization module 150 analyzes the received features (network data) and assigns a decision score 159 to each received input signal. The decision score 159 may, in one or more embodiments, indicate whether the system is operating normally or abnormally. The decision score 159 may include a threshold value, whereby when the decision score is outside of the threshold value, the input signal is considered abnormal. The abnormality may be a result of attack or some other abnormality. It is noted that the decision score 159 may act as a confidence rating. As a non-exhaustive example, if the threshold is zero and the decision score is 100, this may indicate a higher confidence the industrial asset 111 is operating in a normal range. The decision score indicates the probability the data is under attack. It is then determined in S416 whether the decision score indicates normal or abnormal operation. When it is determined in S416 that the decision score indicates normal operation, no further action may be taken and the process 400 ends at S418. When it is determined in S416 that the decision score indicates abnormal operation, the process proceeds to S420, and the abnormal values are received at a neutralization module 175. In one or more embodiments an alert 179 may be sent to monitoring devices 170 indicating the incidence of abnormal/attack values. The alert may be sent via any suitable transmission process, and may be sent at the same time, or substantially the same time, as S420, before or after S420.

Next, in S422, the neutralization module 175 may calculate a neutralized value via a neutralization process. The neutralization process may correct features that have been corrupted, where the correction is via an optimization technique. The neutralization module 175 receives a mix of correct and incorrect values, and the neutralization module 175 may determine, for the incorrect values, what the correct value should be. The neutralized value may be an estimated neutralized value, such that the signal is moved to a normal operating space within the resilient decision manifold. The estimated neutralized value may be an estimate of the feature vector under the constraints of the resilient decision boundary to force the feature vector to map to the boundary, or go inside the normal region. In one or more embodiments, the feature vector may be mapped to a location inside the normal region where normal activity is centered (represented by a cluster of feature points in the normal space).

The neutralization module 175 may include a boundary and performance constrained resilient estimator ("BPRE") 157.

Boundary and Performance Constrained Resilient Estimator "(BPRE)":

The BPRE 157 may attempt to estimate true states. Using a model represented by an operator, $\Omega(A, b, C)$, the BPRE 157 may be designed to estimate the true value of the feature vector under adversarial attacks. The BPRE 157 is a resilient estimator that may solve the following optimization problem:

$$\underset{x_k \in \mathbb{R}^n, k \in \{1,\ldots,T\}}{\text{minimize}} \sum_{k=1}^{T} \|y_k - \Omega(A, b, C)x_k - y_b\|_q +$$

$$\frac{1}{2}\rho \sum_{j=1}^{T-1} \|x_j^{prev} - x_j\|_2^2 \text{ subject to score } (x_k, p_1) \leq$$

$$-\epsilon |f(x_k, p_2)| \leq \varepsilon \text{ for } k \in \{1, \ldots, T-1\}$$

In this example, $y_k$ is the sequence of measured/observed values, $x_k$ is the feature vector in the current time step, $x_k^{prev}$ is the feature vector in the previous time step, $\Omega(A, b, C)$ is an operator representing a transfer function from the feature space to the signal space (e.g., the original space or the time domain representation of the signal). $p_1$ and $p_2$ are respective parameter values for the boundary and invariance relationship. q is used to describe optimization approach such as $l_1$ when q=1, $l_2$ when q=2 well-known in the optimization literature. The first constraint in the optimization may ensure that the final estimate falls within the safety envelop with some factor of safety given by $\epsilon$ which can be an arbitrary positive number, or something more intuitive like the distance of the farthest support vector from the multi-dimensional decision boundary. The BPRE 157 may compute a performance constrained resilient estimator from the normal data values received historically from the asset.

In S424, the neutralization module 175 may perform an inverse transform of each estimated neutralized value to generate a neutralized signal. In one or more embodiments, then neutralization module 175 may remove the incorrect portion of the signal and replace it with the corrected values, to generate the neutralized signal.

Inverse Feature Transforms:

When PCAs are used as feature vectors, being a linear transform, inversion can be obtained by the inverse feature transform unit 153. For example, estimated true features may be used to perform a weighted linear sum of basis vectors and then sum the signals with average sensor output. The inverse feature transform unit 153 may transform the features obtained from the boundary and performance constrained resilient estimator back to the signal space. In this example, the true signal for normalcy under attack is given by:

$$\hat{y} = y_0 + \sum_{j=1}^{M} \hat{w}_j \psi_j$$

Where, $\hat{y}$=Estimated Sensor time series data
$y_0$=Average sensor output as before
$\hat{w}_j$=Estimated $j^{th}$ feature
$\psi_j$=$j^{th}$ basis vector The BPRE 157 forces the estimates of the attacked sensor signal back into the normalcy boundary 503 which also translates to normal operation of the original system. As a result, neutralized signals 177 are output from the neutralization module 175. This inversion approach assumes that the feature transform algorithm is well defined and has only trivial kernels (at least injective). A Multi-Mode, Multi-Discipline ("MMMD") feature discovery framework may be used to identify knowledge-based, shallow and/or deep learning features. Note that the MMMD feature discovery framework may be associated with feature engineering (e.g., associated with analysis such as batch selection, basis vector computation, feature extraction, dimensionality reduction, etc.) and engineered and dynamic system feature vectors. Knowledge-based feature engineering may use domain or engineering knowledge of the system to create features from different sensor measurements. These features might simply be statistical descriptors (e.g., maximum, minimum, mean, variance, different orders of moments, etc.) calculated over a window of a time-series signal and its corresponding Fast Fourier Transformation ("FFT") spectrum as well. The knowledge-based features might also utilize analysis of the system, such as basis vector decomposition, state estimation, observability matrices, topology matrices, system plant matrices, frequency domain features and system poles and zeros. These analyses may represent a characterization of the system through steady-state, transient, and small signal behaviors. The feature extraction process may be further associated with a shallow feature learning technique, such as unsupervised learning, k-means clustering, manifold learning, non-linear embedding, an isomap method, Locally Linear Embedding ("LLE"), PCA as described above in one example, Non-linear PCA, Independent Component Analysis ("ICA"), neural networks, a Self-Organizing Map ("SOM") method, genetic programming, and/or sparse coding. A numerical inversion algorithm may be used to convert true features to their equivalent time series form when the features are not well defined as in the PCA case described above. Furthermore, smoothing of the time series signal from previous batches may be required while performing continuous updates.

Then in S426, the neutralized signal 177 may be output to controller for the industrial asset 113. As a result of the process (e.g., filtering out any attack data), the signals provided to the industrial asset controller (or next layer in the chain of command) are correct and free of any attack data. The neutralized signal may completely neutralize the attack, during real-time, and may provide an opportunity for auto-protection of the system.

FIG. 5 is a conception view of a decision manifold, including boundaries and a feature vector that may be associated with monitoring node parameters in accordance with some embodiments. In particular, a graph 500 includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") that is performed on the input data. PCA may be one of the analyses that may be used by the process to characterize the data, but note that other analyses may be leveraged.

The graph includes a hard decision boundary 503. In one or more embodiments, the graph may also include two soft decision boundaries as indicated by the dotted line and the outer-boundary of the striped section. The process may include safety boundaries (e.g., soft decision boundaries) in order to account for any uncertainties or noise in the data. As such, the outer-boundary of the striped section, for example, may be a conservative boundary used in practice. The graph 500 may also include a constraint boundary, as described further below, and indicated by the outer-boundary of the striped section. The space within the decision boundary (e.g., striped region), may be the normal operating space 502. The space outside of the decision boundary may be the abnormal operating space 504. The graph also includes an indication associated with current feature location for feature points in the normal operating space 502 (illustrated with a "circle" on the graph), and an indication associated with current feature location for feature points in the abnormal operating space 504 (illustrated with a "+" on the graph).

The points corresponding to normal operating signals are not considered potential threats while the feature vectors positioned outside the boundary 503 are considered threats or attack signals. These points outside the boundary 503 may also be referred to as attack points or faults. These attack points may be due to cyberattacks moving the previously normal feature vectors represented by points anywhere near or on the normal performance region to anywhere to the attack region designated by points. When the feature vectors are outside the boundary 503, indicating an abnormal event (e.g., attack), the BPRE estimator 157 may can find an estimate of the feature vector along performance constraints inside the boundary that preserves the normal operation of the asset with respect to the control system or other device connected to the asset.

As indicated on the graph 500 by arrow 506, an action of fault or attack (e.g., resulting in thrombus) may move the location of the feature point from the normal operating space 502 to the abnormal operating space 504. The graph 500 also indicates, by arrow 612, that per a correction performed by the BPRE 157 of the neutralization module 175, the location of the feature point may be moved from the abnormal operating space 504 to the normal operating space 502. In one or more embodiments, the system 100 may determine the operation of the industrial asset 111 is normal or abnormal based on the location of the feature point in the decision manifold 503.

During the offline learning phase 302, the detection and neutralization module 150 may also receive updated information to the resilient decision manifold. In one or more embodiments, the detection and neutralization module 150 may constrain the distance between successive resilient decision manifolds. When the boundaries of the resilient decision manifold are changed based on the updated data, the constraints ensure the new boundaries are not located too far from the preceding boundary, which may be a way of addressing attack, protecting the decision manifold and further increasing the resiliency of the decision manifold itself. For example, if the latest updated information used to generate the decision boundary is corrupted, the detection and neutralization module may employ the constraint, so that the modified boundary doesn't move too far, thereby limiting the errors that may be made by the corrupted data. It is noted that the constraint may act to suppress a weight the detection and neutralization module 150 assigns to the new training data. In one or more embodiments, the detection and neutralization module 150 may determine the degree the new training data values are different from the old training data values. When the degree of difference is beyond a threshold value, the new values may be given a lesser weight, and the updated resilient manifold maybe generated based on that information. It is noted that the updated resilient manifold may be based on both correct and corrupted data. However, when the weighting indicates corrupted data in the most recently received data, the updated resilient manifold may be generated with more of the most recent previous data that had a higher weight. An attack on the data used to generate the manifold may be a different attack than receiving corrupted data in real-time.

Figure 6:
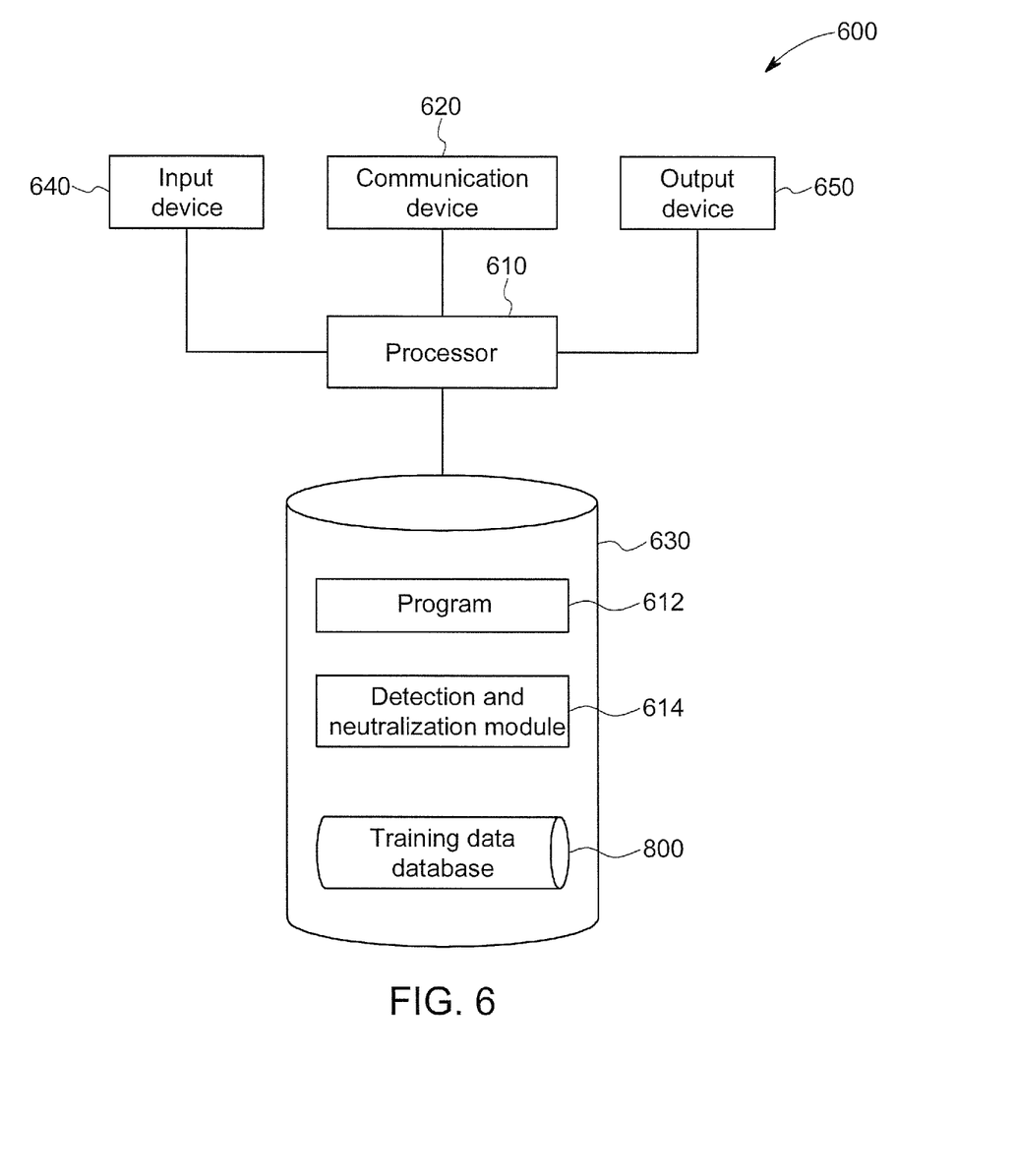
FIG. 6 illustrates a neutralization platform or apparatus in accordance with some embodiments.

The embodiments described herein may be implemented using any number of different hardware configurations. For example, FIG. 6 is a block diagram of a decision manifold protection platform 600 that may be, for example, associated with the system 100 of FIG. 1. The decision manifold protection platform 600 comprises a processor 610, such as one or more commercially available Central Processing Units ("CPUs") in the form of one-chip microprocessors, coupled to a communication device 620 configured to communicate via a communication network (not shown in FIG. 6). The communication device 620 may be used to communicate, for example, with one or more remote data source nodes, user platforms, etc. The decision manifold protection platform 600 further includes an input device 640 (e.g., a computer mouse and/or keyboard to input industrial asset information) and/an output device 650 (e.g., a computer monitor to render a display, provide alerts, transmit recommendations, and/or create reports). According to some embodiments, a mobile device, monitoring physical system, and/or PC may be used to exchange information with the decision manifold protection platform 600.

The processor 610 also communicates with a storage device 630. The storage device 630 may comprise any appropriate information storage device, including combinations of magnetic storage devices (e.g., a hard disk drive), optical storage devices, mobile telephones, and/or semiconductor memory devices. The storage device 630 stores a program 612 and/or a detection and neutralization module 614 for controlling the processor 610. The processor 610 performs instructions of the programs 612, 614, and thereby operates in accordance with any of the embodiments described herein. For example, the processor 610 may receive, from a plurality of data source nodes, a series of monitoring data source node values over time associated with operation of the industrial asset control system. The processor 610 may then perform a resilient decision manifold generation process to generate a resilient decision manifold that may be used to detect corrupt data, and then neutralize the corruption via a neutralization process.

The programs 612, 614 may be stored in a compressed, uncompiled and/or encrypted format. The programs 612, 614 may furthermore include other program elements, such as an operating system, clipboard application, a database management system, and/or device drivers used by the processor 610 to interface with peripheral devices.

As used herein, information may be "received" by or "transmitted" to, for example: (i) the decision manifold protection platform 600 from another device; or (ii) a software application or module within the decision manifold protection platform 600 from another software application, module, or any other source.

In some embodiments (such as the one shown in FIG. 6), the storage device 630 further stores a training data database 800.

Figure 7:
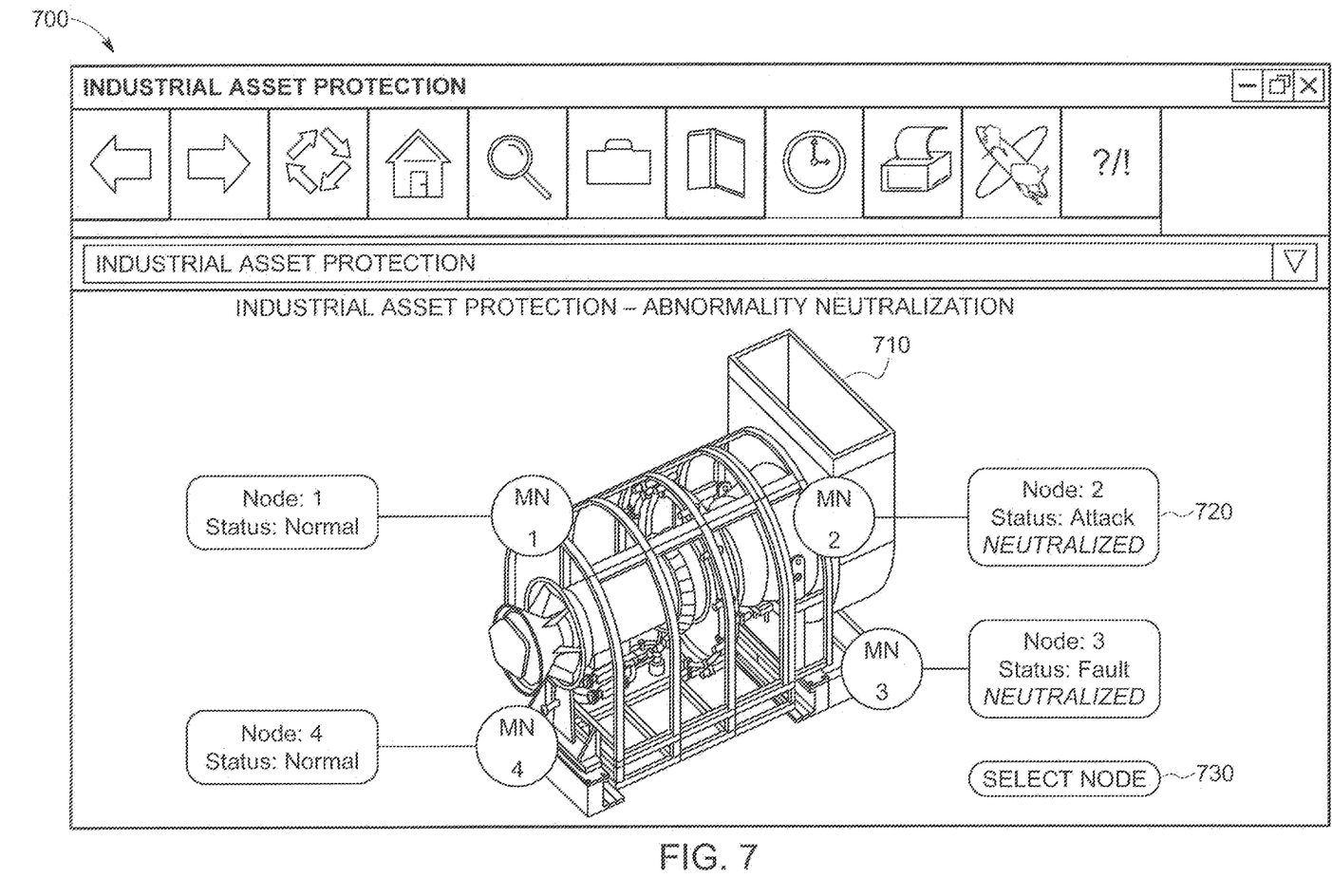
FIG. 7 illustrates a display that might be provided for an industrial asset abnormality neutralization system in accordance with some embodiments.

FIG. 7 is abnormality neutralization display 700 in accordance with some embodiments. The display 700 includes information about an industrial asset 710 having a number of monitoring nodes ($MN_1$ through $MN_4$). In particular, the display 700 includes, for each node, an indication of a current status 720, including fault and attack states as determined by any of the embodiment described herein along with indications of whether or not those abnormalities have been neutralized. According to some embodiments, the display 700 is interactive and may be used by an operator to determine more detailed information (e.g., via selection of an icon 730) and/or to adjust or override the operation of the industrial asset.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on specific types of industrial assets (e.g., gas turbines), any of the embodiments described herein could be applied to other types of assets, such as dams, the power grid, military devices, etc.

The present invention has been described in terms of several embodiments solely for the purpose of illustration. Persons skilled in the art will recognize from this description that the invention is not limited to the embodiments described, but may be practiced with modifications and alterations.

The invention claimed is:

1. A system to protect a decision manifold of a control system for an industrial asset, comprising:
    a detection and neutralization module including:
        a decision manifold creation module having a receiver configured to receive a training dataset comprising data, wherein the decision manifold creation module is operative to generate a first decision manifold with the received training dataset; and
        a detection model;
    a memory for storing program instructions; and
    a detection and neutralization processor, coupled to the memory, and in communication with the detection and neutralization module and operative to execute program instructions to:
        receive the first decision manifold, wherein the first decision manifold separates a normal operating space from an abnormal operating space;
        determine whether there are one or more inadequacies with the detection model;
        generate a corrected decision manifold based on the determined one or more inadequacies with the detection model;
        receive a projected adversary strategy;
        generate a resilient decision manifold based on the corrected decision manifold and received projected adversary strategy; and
        output a neutralized signal based on the generated resilient decision manifold to operate the industrial asset via the control system.

2. The system of claim 1, wherein determining whether there are inadequacies with the detection model further comprises program instructions to:
    generate one or more adversarial models; and
    analyze the detection model to determine whether the detection model is vulnerable.

3. The system of claim 1, further operative to execute program instructions to:
    receive the generated resilient decision manifold;
    receive input signals from monitoring nodes of the industrial asset, each input signal comprising data representing current operation of the industrial asset;
    generate a decision score for each input signal;
    calculate an estimated neutralized value, via a neutralization module, for the input signal when the decision score is outside a threshold value, such that the input signal will be moved with respect to the resilient decision manifold;
    perform an inverse transform of each estimated neutralized value to generate a neutralized signal; and
    output the neutralized signals.

4. The system of claim 3, wherein the received input signal is transformed into a set of feature vectors prior to generation of the decision score.

5. The system of claim 4, wherein the estimated neutralized value is for the feature vector.

6. The system of claim 3, wherein the neutralized signal is received in real-time.

7. The system of claim 2, wherein each of the one or more adversarial models is operative to use data in a training dataset.

8. The system of claim 7, further comprising program instructions to:
    execute each of the adversarial models to generate additional training data.

9. The system of claim 1, wherein the resilient decision manifold is generated during a learning phase.

10. A method, computer-implemented via a detection neutralization processor, to protect a decision manifold for a control system of an industrial asset, comprising:
    generating a first decision manifold with a received training dataset, wherein the first decision manifold separates a normal operating space from an abnormal operating space;
    determining whether there are one or more inadequacies with a detection model;
    generating a corrected decision manifold based on the determined one or more inadequacies with the detection model;
    receiving a projected adversary strategy;
    generating a resilient decision manifold based on the corrected decision manifold and received projected adversary strategy; and
    outputting a neutralized signal based on the generated resilient decision manifold to operate the industrial asset via the control system.

11. The method of claim 10, further comprising:
    receiving the generated resilient decision manifold;
    receiving input signals from one or more monitoring nodes of the industrial asset, each input signal comprising data representing current operation of the industrial asset;
    generating a decision score for each input signal;
    calculating an estimated neutralized value, via a neutralization module, for the input signal when the decision score is outside a threshold value, such that the input signal will be moved with respect to the resilient decision manifold;
    performing an inverse transform of each estimated neutralized value to generate a neutralized signal; and
    outputting the neutralized signals.

12. The method of claim 11, wherein the received input signal is transformed into a set of feature vectors prior to generation of the decision score.

13. The method of claim 12, wherein the estimated neutralized value is for the feature vector.

14. The method of claim 11, wherein the neutralized signal is received in real-time.

15. The method of claim 10, wherein the resilient decision manifold is generated during a learning phase.

16. A non-transitory computer-readable medium storing instructions that, when executed by a detection neutralization computer processor, cause the computer processor to perform a method comprising:

generating a first decision manifold with a received training dataset, wherein the first decision manifold separates a normal operating space from an abnormal operating space;

determining whether there are one or more inadequacies with a detection model;

generating a corrected decision manifold based on the determined one or more inadequacies with the detection model;

receiving a projected adversary strategy;

generating a resilient decision manifold based on the corrected decision manifold and received projected adversary strategy; and outputting a neutralized signal based on the generated resilient decision manifold to operate the industrial asset via the control system.

17. The medium of claim 16, further comprising instructions to cause the computer processor to perform a method comprising:

receiving the generated resilient decision manifold;

receiving input signals from one or more monitoring nodes of the industrial asset, each input signal comprising data representing current operation of the industrial asset;

generating a decision score for each input signal;

calculating an estimated neutralized value, via a neutralization module, for the input signal when the decision score is outside a threshold value, such that the input signal will be moved with respect to the resilient decision manifold;

performing an inverse transform of each estimated neutralized value to generate a neutralized signal; and outputting the neutralized signals.

18. The medium of claim 17, wherein the received input signal is transformed into a set of feature vectors prior to generation of the decision score.

19. The medium of claim 18, wherein the estimated neutralized value is for the feature vector.

20. The medium of claim 17, wherein the resilient decision manifold is generated during a learning phase.

* * * * *